US011898766B2

(12) United States Patent
Hartman

(10) Patent No.: US 11,898,766 B2
(45) Date of Patent: Feb. 13, 2024

(54) OPTIMIZING BUILDING HVAC EFFICIENCY AND OCCUPANT COMFORT

(71) Applicant: Thomas Hartman, Georgetown, TX (US)

(72) Inventor: Thomas Hartman, Georgetown, TX (US)

( * ) Notice: Subject to any disclaimer, the term of this patent is extended or adjusted under 35 U.S.C. 154(b) by 0 days.

(21) Appl. No.: 17/994,354

(22) Filed: Nov. 27, 2022

(65) Prior Publication Data

US 2023/0123444 A1 Apr. 20, 2023

Related U.S. Application Data

(62) Division of application No. 17/718,742, filed on Apr. 12, 2022, now Pat. No. 11,543,146, which is a division of application No. 17/175,356, filed on Feb. 12, 2021, now Pat. No. 11,306,940.

(60) Provisional application No. 62/976,189, filed on Feb. 13, 2020.

(51) Int. Cl.
| | |
|---|---|
| *F24F 11/56* | (2018.01) |
| *H04L 67/125* | (2022.01) |
| *F24F 11/46* | (2018.01) |
| *F24F 11/54* | (2018.01) |
| *F24F 11/47* | (2018.01) |
| *F24F 11/65* | (2018.01) |
| *H05B 47/10* | (2020.01) |
| *F24F 120/20* | (2018.01) |

(52) U.S. Cl.
CPC ............. *F24F 11/56* (2018.01); *F24F 11/46* (2018.01); *F24F 11/47* (2018.01); *F24F 11/54* (2018.01); *F24F 11/65* (2018.01); *H04L 67/125* (2013.01); *H05B 47/10* (2020.01); *F24F 2120/20* (2018.01)

(58) Field of Classification Search
CPC .................................................... H04L 67/125
See application file for complete search history.

(56) References Cited

U.S. PATENT DOCUMENTS

| | | | | |
|---|---|---|---|---|
| 11,274,848 B2* | 3/2022 | Fujiwara | ................. | F24F 11/49 |
| 2008/0277486 A1* | 11/2008 | Seem | .................... | H04L 67/125 |
| | | | | 236/49.3 |
| 2016/0210569 A1* | 7/2016 | Enck | .................. | G06Q 10/0637 |

* cited by examiner

*Primary Examiner* — Nathan L Laughlin
(74) *Attorney, Agent, or Firm* — FisherBroyles, LLP; Jeremy P. Sanders

(57) ABSTRACT

In a commercial building, individual occupant thermal comfort is achieved with optimal cost and energy efficiency through the integration of a variety of local thermal comfort components into a communication network that employs emerging optimization principles to meet individual preferences for the thermal environment on a workstation basis while reducing building energy use and operating in accordance with any constraints on the energy grids that serve the buildings. These multiple objectives are met in part through a robust communication network that employs distributing processing to achieve preferred thermal conditions with optimal control of all components at subzone, zone, system, central plant, and energy grid levels.

10 Claims, 12 Drawing Sheets

OPTIMIZING BUILDING HVAC EFFICIENCY AND OCCUPANT COMFORT

RELATED APPLICATIONS

This application is a divisional of application Ser. No. 17/718,742 filed Apr. 12, 2022 which is a divisional of application Ser. No. 17/175,356 filed Feb. 12, 2021, now U.S. Pat. No. 11,306,940, which is a non-provisional of U.S. Provisional Patent Application No. 62/976,189 filed Feb. 13, 2020. The prior applications are incorporated herein by this reference.

COPYRIGHT NOTICE

© 2020-2022 Thomas Hartman. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure is in the field of commercial building heating, ventilation, and air conditioning ("HVAC") and pertains to methods, systems and apparatus to collect and utilize data regarding individual preferences for thermal comfort and to coordinate these preferences with others in various thermal zones.

BACKGROUND OF THE INVENTION

Thermal comfort (or discomfort) is a major complaint in commercial buildings. A recent survey of more than 34,000 occupants in 215 commercial buildings found only 11% were satisfied with the thermal conditions in their buildings. It is recognized that individual human variations in desired thermal environments makes the longstanding strategy of providing a uniform thermal environment throughout building spaces obsolete. A shift is now being made to providing commercial building occupants with some individual control over their workspace thermal environments. However, efforts are also underway to encourage the commercial building sector to become more energy efficient. Adding individual thermal control is seen as contrary to this effort since adding individual occupant control has historically resulted in an increase in the energy consumption of commercial buildings.

At the same time, environmental concerns are making the use of non-carbon emitting sources of energy more attractive. These sources which are being led by solar voltaic and wind generation have been shown to be sufficiently abundant to provide a substantial portion of energy requirements for electrical grids, but they lack the ability to predict and control the short-term capacity that traditional sources of building energy sources have. So, as these sources are integrated into electric grids, the ability to adjust loads to meet short term constraints within the grid as well as employ the lowest cost and most environmentally friendly energy sources is needed.

In prior art, U.S. Patent Application Publication No. US 2019/0041883 to Clark et al. ("Clark") discloses an air movement device located in a subzone ("microzone") of a larger zone ("macrozone") and a method of coordinating its operation to cause the cooling effect of air movement for local thermal comfort control with the temperature control of the larger zone (macrozone). The specification describes the air movement device and communication links for its operation and coordination. However, Clark's disclosure is limited to a single specific means of providing local comfort and relies on continuous network communications for it to operate. These important limitations are avoided by the new method of subzone control disclosed and described below. More generally, the need remains to improve individual occupant comfort while reducing the use of energy resources and environmental impact for the whole building.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present application discloses the incorporation of occupancy, occupant preferences, direct occupant interaction, and the nature and current energy consumption of the local devices as well as the cost and availability of the sources to the building into the operational decision making at the individual workstation level. It regulates additional comfort factors beyond traditional space temperature control to provide localized variations in the thermal environment to satisfy the different thermal environment preferences among occupants at workstations in close proximity. Further, local controllers report to the building energy system(s) over a network in order to ensure the overall building system, that includes workstation-based components, is operating at optimal efficiency and is also continuously (or frequently) adjusted to ensure optimally efficient operation and responds effectively to constraints in the grid(s) that supplies energy to the building. In some embodiments, multiple subzone comfort devices can be employed and complete logic and control capabilities for subzone control are incorporated into each local subzone controller).

In some embodiments, the building occupants may be engaged to encourage their active support in ensuring the building operation is as efficient and environmentally responsible as possible. Occupant engagement and participation may be implemented, for example, through communications with their local sub-zone (or workspace) controller logic. In some embodiments, that logic may be implemented in a smart terminal unit. In some other cases, that logic may be implemented at the server level or remotely and communicated through the cloud.

In one example embodiment, an HVAC networking system comprises the following:
  a zone controller arranged to connect to a VAV box to control flow of conditioned air into a zone of a building;
  plural subzone controllers, each associated with a corresponding subzone in the zone, and communicatively coupled to the zone controller;
  each subzone having local components that provide thermal comfort control, lighting, power, or other amenities for the subzone occupant(s), and each component arranged for communication with the corresponding subzone controller;
  the local subzone components in each subzone arranged to communicate operating data to the corresponding subzone controller;

wherein the subzone controller is arranged to collect the operating data from each of the components, generate aggregated subzone operating data based at least in part on the collected data, and communicate the aggregated subzone operating data to the zone controller ZID;

wherein the zone controller is arranged to collect the subzone operating data from the subzone controllers, generate aggregated zone operating data based at least in part on the collected subzone operating data, and communicate the aggregated zone operating data to a remote server that captures, stores, and processes this the data.

In another example embodiment, a method for improving user comfort and optimizing building energy efficiency in a commercial building served by an HVAC system, comprising:

identifying a zone of a building that is served by a zone-wide primary comfort component, the zone-wide primary comfort component operated by a zone controller;

designating plural subzones within the zone, each subzone arranged to receive thermal comfort conditioning from the primary comfort component;

in each designated subzone, providing a local subzone controller associated with the corresponding subzone, thereby defining a one-to-one relationship between each local subzone controller and the corresponding subzone;

in each local subzone controller, identifying at least one auxiliary thermal comfort control component that is local to the subzone and operated by the subzone controller;

in each local subzone controller, determining current occupancy status, current thermal comfort conditions and current comfort settings of the subzone;

in each local subzone controller— calculating a comfort factor adjustment to satisfy the current subzone comfort settings based on the current occupancy status and the current thermal comfort conditions;

determining a least-cost or most energy efficient combination of adjustments (a) to the zone-wide primary comfort component and (b) to operation of the subzone auxiliary thermal comfort component(s) to achieve the calculated comfort factor adjustment;

communicating the determined primary comfort component adjustment as a request to the zone controller;

determining and executing an immediate adjustment to operation of the identified subzone auxiliary thermal comfort component(s) to achieve the calculated comfort factor adjustment with the current state of the zone wide thermal comfort component so as to quickly achieve the desired subzone thermal comfort setting; and periodically readjusting the operation of the subzone auxiliary comfort component(s) as the zone-wide comfort component is adjusted by the zone controller, thereby to increase overall efficiency of the conditioning system and better meet the current desired thermal comfort setting at all subzones.

The present innovation generally must be implemented in a combination of hardware and software (i.e., stored, machine-readable instructions) for execution in one or more processors. The volume, frequency and complexity of operations involved preclude any manual or "pencil and paper" solution as impracticable. Such processors may be provisioned in the building server, zone controllers, subzone controllers, and smart terminal units. Additional logic may be implemented in HVAC systems at the building or campus level. The following is a detailed description of some preferred embodiments, which proceeds with reference to the accompanying drawings.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings in which.

DETAILED DESCRIPTION OF PREFERRED EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments. Like numbers refer to like elements throughout the various views and drawings. As used herein, the term "and/or" includes any and all combinations of one or more of the associated listed items. We begin with the following review of the state of the art.

Figure 1:
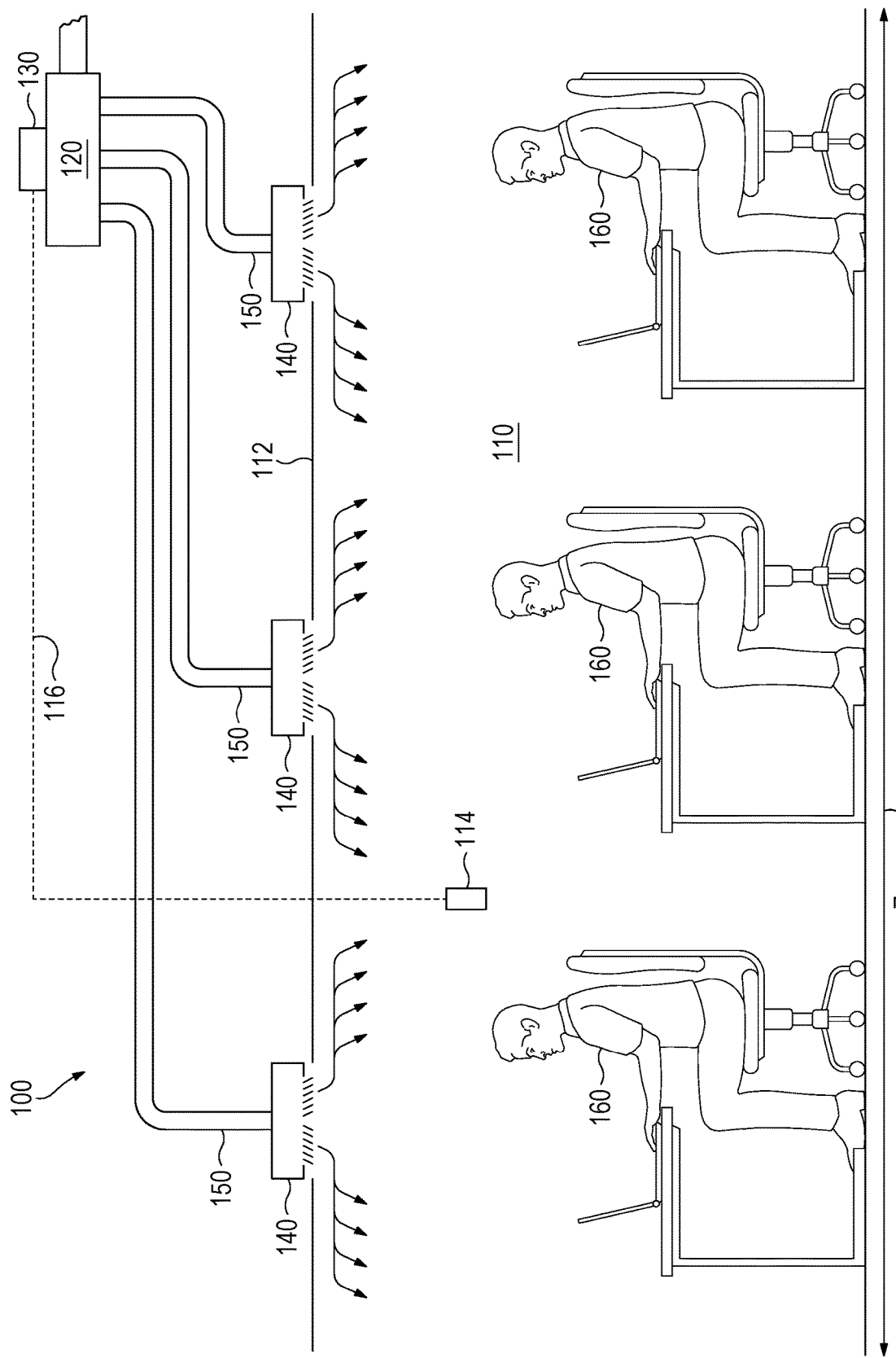
FIG. 1 (Prior art) is a simplified diagram that illustrates a variable air volume ("VAV") building comfort system for conventional temperature control of building spaces with a VAV box zone control unit and standard diffusers to distribute conditioned air to the zone.

Typical HVAC systems that operate in commercial buildings supply conditioning to multiple "zones" within the building. In FIG. 1, diagram 100 illustrates conventional comfort control of building spaces with a variable air volume system which is the most commonly employed type in commercial buildings. In FIG. 1, a VAV box unit 120 regulates the flow of conditioning air to the zone it serves with standard diffusers 140 which may be mounted in or below the ceiling 112. In this arrangement, usually a single temperature sensor 114 located in zone 110 provides zone temperature to a VAV box controller 130 which is part of the building automation system (BAS). Airflow from the VAV box or air handler is established based on difference between zone temperature and temperature setpoint. The portion of zone air flow to each diffuser is fixed, established by initial system balancing. Airflow is provided to each diffuser by a suitable pipe, duct or the like, indicated by 150. Because the conditioned air from the VAV box is at a temperature that is too cold, or in winter too hot, to be comfortable, the airflow from ceiling diffusers 140 is directed across ceiling 112 where it mixes with, and cools, or warms, room air to lower or raise the space temperature, providing indirect conditioning to occupants below.

Each zone generally encompasses several hundred to a thousand or more square feet of occupied area and each zone typically serves multiple occupants. Generally, just a single temperature sensor (sometimes referred to as a thermostat) 114 located somewhere in the zone is incorporated to control the source of conditioning to each zone. The zone temperature sensor 114 is coupled to the BAS zone controller 130 by a wired or wireless connection 116. There is very little and often no means for temperature adjustment within each zone to accommodate the different thermal preferences of the multiple occupants that inhabit the zone. Because each zone is independent from adjacent zones, there can also be issues among adjacent zones wherein attempting to maintain different thermal conditions between zones can result in the zones "fighting" each other to maintain different thermal conditions and resulting in additional energy expended without achieving noticeable thermal differences between adjacent zones. For this reason, allowing occupant adjustment of the zone thermostat is discouraged and often not allowed in commercial buildings.

Where local control is applied, the devices intended to enable individual thermal and lighting level adjustment are generally stand alone and not incorporated into the operation of the overall HVAC system. So, personal comfort devices such as supplemental heaters or temperature-controlled air diffusers, because they are not incorporated into the HVAC system, are more likely to increase overall energy use. For example, operating a separate, independently controlled, local heat source such as a portable space heater may warm the air surrounding the temperature sensor that controls airflow to the zone a zone and cause the HVAC system to provide additional cooling to the zone, countering the effect of the local heat source and adding even more energy cost to its operation, and possibly resulting in additional discomfort to other zone occupants.

Figure 2:
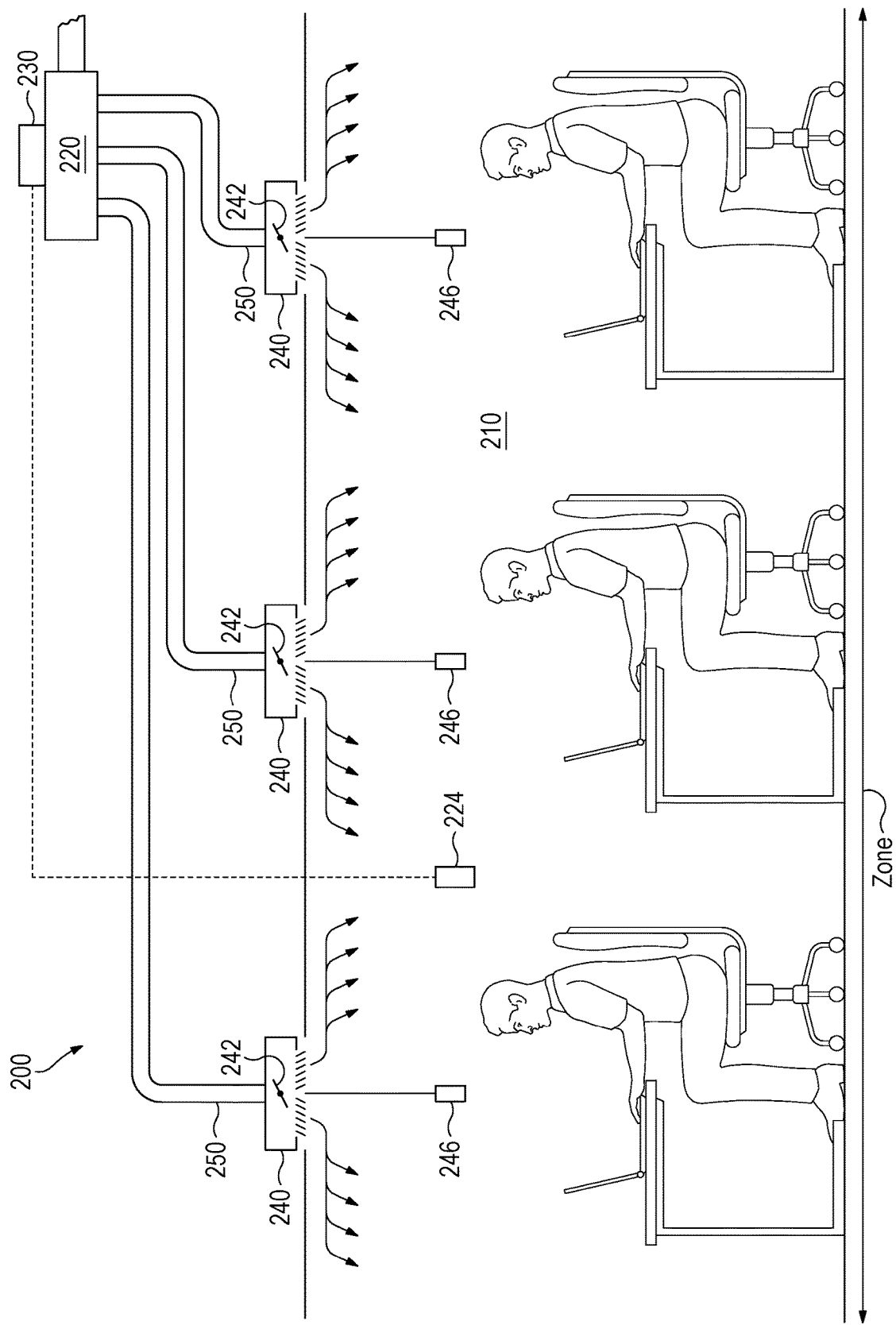
FIG. 2 (Prior art) is a simplified diagram that illustrates a ("VAV") building comfort system for conventional temperature control of building spaces with a VAV box zone control unit but using smart diffusers to distribute conditioned air to the zone.

FIG. 2 in the drawings illustrates control of a space with smart diffusers. The system is similar to that in FIG. 1 except as follows. In this arrangement, the zone temperature sensor 214 located in zone 210 still provides zone temperature to VAV box controller 230 to control the amount of conditioning air delivered to the zone from the VAV box as in FIG. 1. However, smart diffusers 240 replace the standard diffusers of FIG. 1 and by positioning their internal air dampers, adjust relative air flow among the smart diffusers in the zone. But due to the indirect means of distributing the conditioned air into zone, variations in the resulting conditioning cannot effectively target specific areas. Furthermore, airflow from VAV box 220 or air handler is established by VAV box controller 230 based on difference between zone temperature and temperature setpoint as in FIG. 1 so these smart diffusers do not generally affect the total conditioning supplied to the zone. A means of sensing local temperature is provided for each smart diffuser—independent of VAV box temperature sensing and control. The individual smart diffuser temperature sensors 246 may be integrated into the smart diffuser or implemented as a separate wall-mounted sensor.

The portion of conditioning air flow to each smart diffuser 240 is automatically adjusted with a corresponding damper 242 with actuator in each smart diffuser and is based on the local temperature and local setpoint at each smart diffuser. Airflow from each smart diffuser is directed across ceiling where it mixes with room air to provide indirect conditioning to occupants below. Occupants can change the local air flow by adjusting the temperature setpoint at each smart diffuser, but overall air flow and thus level of conditioning supplied to the zone is established by zone thermostat 214 which is connected to the BAS VAV box controller 230. Local setpoint may be adjusted by wall-mounted interface, wireless connection, etc. The application of smart diffusers is usually able to make zone comfort conditions more uniform throughout at zone, but they are generally not effective in providing the variations in the thermal environment between adjacent workstations that may be desired by their occupants.

Figure 3:
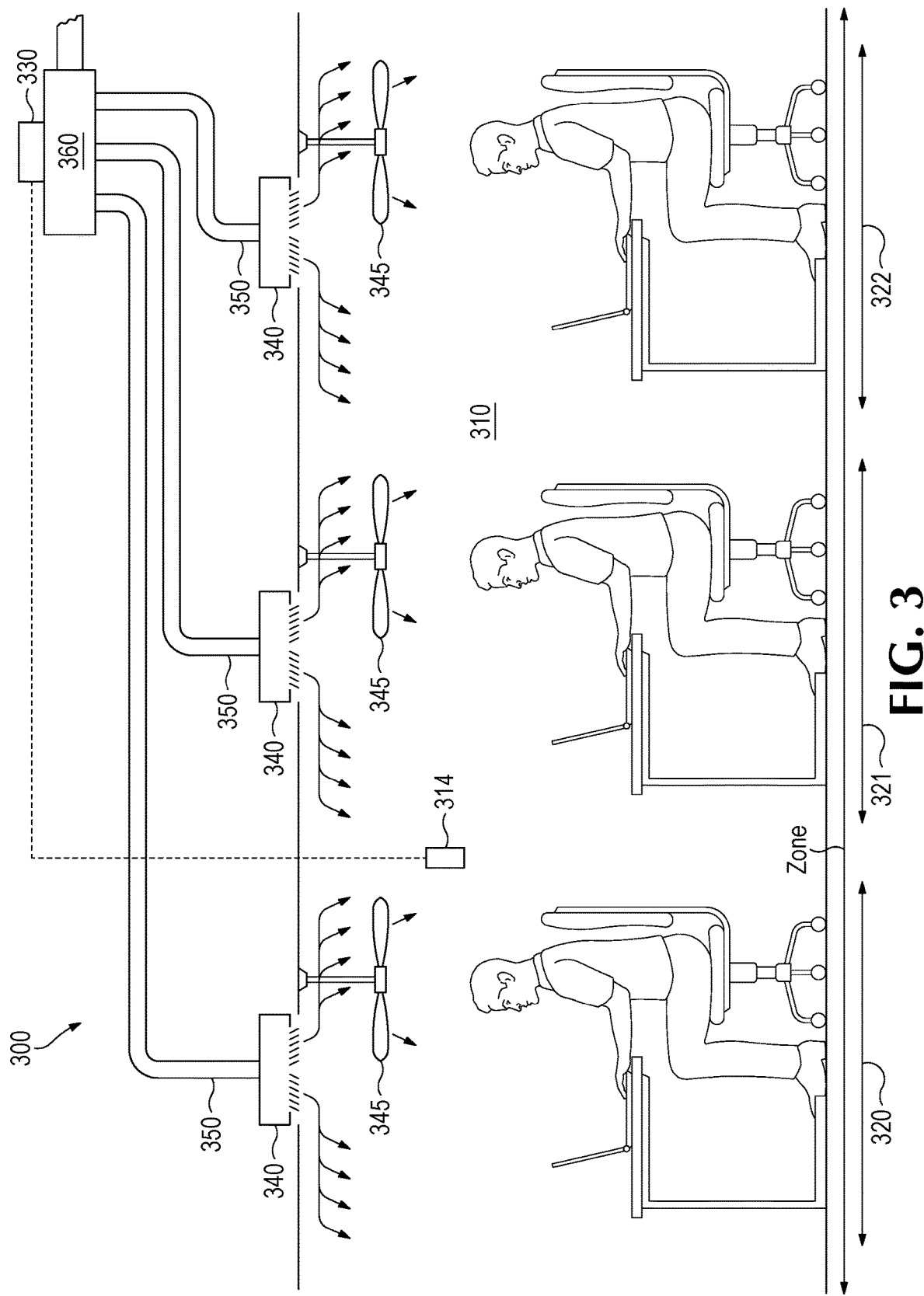
FIG. 3 (Prior art) is a simplified diagram that illustrates a ("VAV") building comfort system for conventional temperature control of building spaces with a VAV box zone control unit utilizing standard diffusers and a separate auxiliary component that allows adjustment of local thermal conditioning levels by controlling a secondary (air movement) comfort factor independent of the VAV system operation.

FIG. 3 illustrates conventional control of space and VAV box unit 360 with standard diffusers and auxiliary devices. In FIG. 3, each user's workstation and respective work area is identified as a sub-zone 320, 321, 322. The arrangement in this figure is similar to FIG. 1 except as described below. As in FIG. 1, a temperature sensor 314 located in the zone provides zone temperature to VAV box controller 330 and airflow from VAV box or air handler is established by BAS VAV box controller 330 based on difference between zone temperature reported by 314, for example, and temperature setpoint.

Also as in FIG. 1, a portion of air flow to each diffuser 340 is fixed, established by initial system balancing. Airflow from ceiling diffusers is directed across ceiling where it mixes with room air to provide indirect conditioning to occupants below. However, in FIG. 3, an auxiliary individual comfort device, for example a ceiling fan 345, allows localized air movement to adjust or modify the local thermal environment with adjustment by each occupant via smart phone, or some may automatically adjust air movement to compensate for space temperature changes in order to maintain a constant thermal condition in each subzone as the space temperature varies. However, the current art in FIG. 3 does not integrate the operation of the ceiling fan into the operation of the HVAC system for coordinated overall optimized energy efficient operation. Nor does the system in FIG. 3 allow automatic readjustment of the relative contribution of the space temperature and air movement in response to constraints that include a short-term elevated rate structure, in the grid or other external limitations, or allow other subzone components to be integrated into a uniform local environmental control system.

New Comfort Network

The general purpose of this invention is to improve building occupant comfort and building energy utilization through the optimized use of low cost and low environmental impact energy sources by providing integrated individualized workstation-based thermal control, that simultaneously reduces overall energy use, and improves the capacity of the building energy systems to which the invention is applied to match constraints of the power grid(s) that serve(s) the building thereby minimizing the cost and environmental impact of the energy that is consumed by the building. In this disclosure, we use the term "workstation" to refer to a work area (workspace, office, cubicle, etc.) rather than a device such as a desktop computer. Each workstation has one, or in some cases multiple occupants. And the space in and around which each workstation is located is herein called a subzone.

Thermal comfort, for typical healthy individuals, is a sense of comfort determined by several factors in the individual's (or user's) environment, mainly the following: First, Space Temperature—this is the temperature in the space (for example, a subzone) that is measured with a common thermometer, which may be integrated into a component such as a terminal unit.

Second, Mean Radiant Temperature—this is the thermal effect of the heat that is radiated from the walls, windows, floor and ceiling in the space of interest. The "mean" radiant temperature is simply the combined effect of all of them (according to known formulae). Where a room has been at a stable temperature for some time, and only interior walls, floors and ceiling, it is likely that the mean radiant temperature is equal to the space temperature because all these surfaces will have the same temperature as the space. But if, for example, it is cold outside and a user is sitting near a window, they will perceive a cooler thermal condition than the space temperature would indicate, because they are subject to a lower mean radiant temperature. In still air environments, one can assume the mean radiant and space temperature are about equal in their effect on comfort. For example, if one is seated in a space that has a space temperature of 73 F and a mean radiant temperature of 71 F, their perception of comfort will be a surrounding temperature of approximately 72 F. For purposes of comfort calculations, Space and Mean radiant temperatures are often combined together in a term called "Operative Temperature." In this example, the operative temperature would be approximately 72 F.

Third, Air Movement—This is the average velocity of the air surrounding a user as they occupy a space. The faster the air is moving around you, the cooler you feel due to the increased rate of conduction of heat from your body by the air movement. A small change in air movement by as little as 20 feet per minute (which is imperceptible to most people) has about a 1 degree F. change in thermal sensation, i.e., thermal comfort. Finally, Humidity in the range that exists in most commercial buildings has a very small effect on thermal sensation and is not considered here for the purposes of this application. The above factors together determine and describe a current thermal condition of a space.

Thus, it will be seen that we apply adjustments to any and all of these three factors, depending on what components are deployed in the HVAC system, to allow individualized thermal conditions at each workstation. More specifically, based on individual preferences expressed for each workstation, we trade off or balance the costs and effectiveness of local (zone and subzone) component adjustments versus the costs or availability of the HVAC system supply adjustments (say, at a building HVAC system air handler) such as space temperature to arrive at the optimal combination of comfort factor adjustments in terms of both energy efficiency and system constraints or limitations to meet the users' thermal comfort preference which may be different at each workstation.

In some embodiments, intelligent terminal devices of various types can be operated to adjust the thermal conditions in each local workstation environment. One embodiment of this invention relies primarily on adjusting space temperature and the local air movement for this purpose, but may also use other local components, such as localized radiant panels, locally applied heating or cooling such as a conditioned chair, floor pad or desk. Local equipment advantageously is incorporated into the system as part of an overall comfort strategy as will be shown.

In other aspects of the invention, we incorporate occupancy, occupant preferences, direct occupant interaction (for example, user interface dialog), and the nature and current energy consumption of the local components as well as the cost and availability of the energy sources to the building into the operational decision making at the occupant level. In some embodiments, local controllers report to the building automation system(s) over a network in order to ensure the overall building system, that includes individually or locally controlled components, is operating at optimal efficiency and is also adjusted to ensure the most effective utilization of the energy sources and the grid(s) that supplies energy to the building.

Further, in some embodiments, the building occupants may be engaged to encourage their active support in ensuring the building operation is as efficient and environmentally responsible as possible. Occupant engagement and participation may be implemented, for example, through communications with their local sub-zone (or workspace) controller logic. In some embodiments, that logic may be implemented in a smart terminal unit. In some other cases, that logic may be implemented at a higher level in the network.

Some workspaces incorporate teams, or multiple occupants working in close proximity. In such configurations, depending on the local control device(s) available, either a single or multiple occupants may inhabit each workstation. The term "local" is employed to designate the level of control. For the purposes of this document, the terms "local" and "individual" and "personal" when related to means of control have identical meaning. It is the configuration of the workspace(s) served by the local control devices that will determine which term is most appropriate. The operation of one or more devices that may serve more than a single occupant due to this proximity issue is described in an embodiment description of the invention.

An example embodiment in which physical equipment is connected on a new, robust "comfort network" is as follows. Consider a commercial office building that has multiple comfort conditioning zones that are intended to provide for the thermal comfort for the occupants. Some zones may encompass large open areas of office space while others may serve multiple, closed-door offices. Each zone has multiple occupants at various workstations in the zone. Conditioning to the zone is provided by air that can be cool or warm, depending on the zone space temperature compared to the temperature setpoint for a thermostat located somewhere in the zone. The amount of heating or cooling to the zone may be determined by the rate of air flow to the zone or some other known method of space conditioning.

Locally-controllable comfort units may include multifunctional intelligent terminal units (Uniterms), for example that are capable of internally adjusting more than a single comfort factor, but existing units that regulate air flow from the HVAC system or can adjust local air flow and/or air movement, heating, cooling, other comfort/visual parameters in and around the workstation also can be incorporated into this network. As discussed below, software setup processes may survey or "discover" local (subzone) components (through the communications network that may be connected by wire or wirelessly). Some of that equipment may be known in the prior art for independent operation, but it has not heretofore been incorporated into an integrated, coordinated, networked system that optimizes individual user comfort while optimizing energy efficiency over multiple zones and whole buildings.

Other locally-controllable units for different types of HVAC/Lighting systems that are also prior art or not disclosed in this invention can be incorporated into the new network for applications with HVAC system types that condition building spaces using other methods of heating or cooling the zone, such as radiant HVAC systems. Such locally adjustable units preferably are incorporated into the new network disclosed herein, so that they not only permit each occupant to adjust their local thermal comfort and/or lighting levels, but also with the networked device installed within or separate from such devices, provides a means for occupants and the system to monitor the thermal and occupancy condition at each workspace, the current workstation energy use, and to communicate with the local occupant through their smart phone or other wireless smart device or user interface. The networked devices preferably can also communicate with other devices, the building automation system (BAS) that operates the HVAC system, and the grid(s) that supply energy to the building.

Illustrative Implementations

To implement this technology, in one embodiment, a main workstation network-ready device or "Main NRD" is installed as a part of, or as an add-on to, the local comfort control component designated as the primary comfort control component for the subzone. Each subzone must have exactly one primary comfort control component. This component may be the Uniterm, or a ceiling fan or other local thermal control component. In addition, a Satellite NRD is installed as part of, or as an add-on to, each of the other locally-adjustable comfort components that may be present in the subzone that is to be included in the network. For example, the network-ready device may have wired or wireless communication capability. Details of network communications, for example, packet protocols, are known. In an embodiment, each of the network-ready devices includes a processor and memory along with input and output control capacity and is preprogrammed with the operating characteristics of the component to which it is attached. These characteristics may include operating efficiencies, capacities and thus operating energy use of the various subzone components at different levels of capacity.

Each NRD is capable of controlling the component in which it is installed (or to which it is operationally coupled). The component may include (or is coupled to) various instrumentation, most notably temperature, occupancy sensors, and other sensors to inform the occupant and the system of environment conditions at the workstation. The desired level of operation of each thermal comfort component in each workstation is based on local occupant's thermal preferences and a calculation of the optimal combination of comfort factors to achieve this preference. This calculation is made at the Main NRD based on information gathered from the Satellite NRDs in the workspace and other information regarding overall system and grid operation transmitted to the Main NRD from the building server and a zone interface device (ZID). This desired level of operation of each component in the workstation is then transmitted its NRD which then controls the component through its I/O capacity to achieve that level of operation. Local occupant preferences may be transmitted to the Main network-ready device NRD, preferably wirelessly via personal instrument such as a smart phone. (See FIG. 6.) A suitable phone "app" may be arranged to communicate with the Main NRD. A thermal monitoring capacity of the network-ready device coupled to each local comfort component on the new network obviates the need for a conventional thermostat that is normally applied to control the space temperature of the zone, since the new network, albeit separate from the usual building automation system (BAS) control network, can communicate to that network through one or more specific interface points as will be shown.

At any point in time one or more workstations may be unoccupied as is typical in commercial buildings. Studies show that commercial buildings are generally not at or near full occupancy during much of their designated occupied hours. Since in the preferred embodiment conditioning is supplied by air in a VAV system, each device at an unoccupied workstation will automatically reduce or shut off the air supply to the local workstation to maintain it in a standby thermal condition. This reduces overall building energy use by directing conditioning to spaces and workstations that are currently occupied. All each Main NRD needs to do is to report to the ZID the airflow it needs to achieve the space temperature factor of the local thermal environment needed in the subzone. When a subzone becomes unoccupied, the Main NRD simply reports that it needs a zero (or near zero) airflow requirement. However, for other purposes, such as developing a typical pattern of occupancy so the system can anticipate the next occupancy, the occupancy condition may be communicated to the building server to develop these patterns and anticipate when the occupant is likely to return. This data may be used to determine the setback for the subzone. In other embodiments, the local device will operate the comfort unit to which it is attached to minimize to the greatest extent possible the energy use when the local workstation is unoccupied.

Example Operation

In the following sections, we refer to various communications between and among various HVAC elements. These communications may be implemented by any convenient means. Preferably, they are implemented using standard electronic communication equipment and protocols to control cost. For example, computer networking equipment and protocols such as those commonly used for office local-area networks (LAN) and wide-area networks (WAN) may be used. WiFi also is convenient for some communications. Other, lower bandwidth systems may be used as well. For example, technology is known for sending and receiving limited amounts of data over ordinary (110 v) power lines. Short-range wireless technology such as Bluetooth® also may be helpful in some applications or portions of the network. The particular communications technology used is not critical. It may be wired, wireless or a hybrid, depending to some extent on conditions and what is available in the building. For potentially sensitive building locations, say government or military operations, due care should be given to security of the communication systems as well as the HVAC control systems to avoid hacking, malicious code, and the like.

Consider next that one or more of the occupants requests a cooler work environment at their workstation, for example, by communication with the Main NRD coupled to the local comfort device. This desire may be accomplished by a slight increase in the local air movement around the workstation, for example, by providing a fan that is incorporated into, or separate from, the air supply component that provides conditioning to the workstation area. This may be the "component" coupled to the workstation's Main NRD or another workstation component in communication with the Main NRD through its Satellite NRD. The ASHRAE Thermal Comfort Tool provided on-line by CBE shows that a nearly imperceptible change of only 20 feet per minute in surrounding air velocity will change an individual's thermal comfort perception by about 1 degree F. without changing the space temperature, as it is often difficult to individually control the space temperature in subzones. The exact change depends on certain other conditions.

Assuming the other occupants in directly adjacent workstations in the same zone have not expressed any desire for adjustment, their devices do not change either the temperature setpoint (and thus the rate of conditioned air flow from the HVAC system) or the localized air movement in their workspaces, so their thermal conditions remain unchanged. At regular "update intervals," for example, around 30 seconds or one minute, all networked units in the zone communicate with each other and with the HVAC system, particularly VAV ox or the element of the HVAC system that controls the zone, as further described below. In a preferred embodiment, both power and communications may be provided to the Main NRD and smart terminal unit over a cable from the VAV box.

The new comfort network incorporates the inter-unit communication to combine current conditions of the subzones within each zone that include occupancy, occupant preferences, thermal conditions, and the operating parameters of the components located at each workstation (subzone), along with any changes in conditions over the most recent one or more "update intervals." An update interval may be on the order of around 30 seconds to a few minutes; the exact interval is not critical. This data is assembled and communicated to the HVAC system in order to direct the system to provide only the conditioning that is necessary to satisfy the current occupants the zone in the most energy efficient manner possible, using low energy means of conditioning as much as possible.

In one implementation, the HVAC system is first interrogated to determine the current operating parameters regarding the marginal cost for providing conditioning air and the marginal cost for providing the cooling or heating of the conditioning air. These parameters may be provided in several forms. For example, as a default, the HVAC system may simply provide the current air handling fan speed and fan power which is used to calculate at the building server level the marginal cost of an increase or decrease in air flow. Or the HVAC system may internally calculate and provide the current marginal cost for delivering each added unit of airflow to the zone. Since the HVAC systems to which this invention will connect are likely to vary widely in both information available and computations included, the interface to the HVAC system preferably has the ability to be custom programmed to convert whatever information form it is provided to obtain either a direct calculation or an estimate of the marginal cost for the HVAC system resources provided to the zone.

Figure 4:
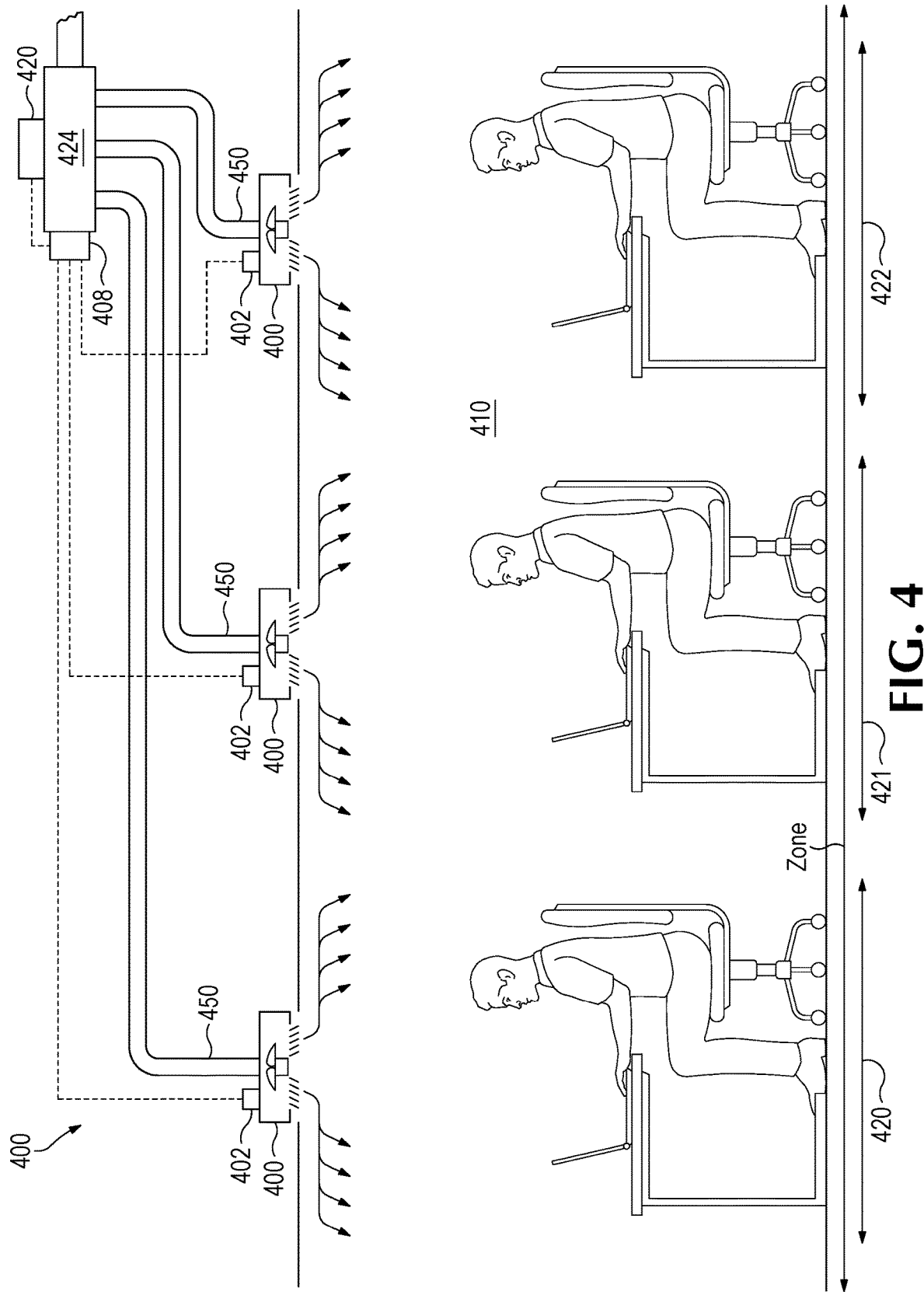
FIG. 4 is a simplified diagram of an embodiment of the invention that illustrates a VAV system that provides coordinated localized individual thermal control at each workstation by utilizing smart multi-functional terminal units ("Uniterm") that maintain thermal comfort conditions by coordinating the control of both the space temperature and localized air movement, to achieve individualized and optimized thermal control at each workstation or subzone.

FIG. 4 is a simplified diagram that illustrates one example embodiment of a system for individual thermal comfort control of each workstation space utilizing smart terminal units or outlets ("Uniterm") 400. We use Uniterm to refer to a "smart" terminal unit or outlet, that replaces standard or smart diffusers of the earlier Figures; that is, the unit is a system component that includes a processor and associated memory, as well as communications capabilities and has the ability to monitor and control more than a single comfort factor.

A prior art unit could communicate with the local occupant. Here, each improved Uniterm 400 also can communicate with a zone interface device (ZID) 408 which is interfaced to the BAS zone controller 420. Sensors (not shown) integrated into each Uniterm 400 provide local temperature and occupancy conditions for the workstation it serves for thermal control by the Uniterm. Uniterm affects workstation comfort conditions by adjusting two comfort factors locally; space temperature and air movement. It directs conditioning to an area directly below the unit. Air from Uniterm can be directed toward an occupant (as illustrated) because primary air is mixed with room air in the Uniterm with an internal fan, eliminating the need to "diffuse" primary air with room air outside the unit before introducing it to the spaces. Occupants can request adjustment of the local thermal conditions and the subzone Uniterm will respond by adjusting space temperature and local air movement around the workstation (and will also incorporate other local thermal comfort components that may be incorporated into the subzone network) using the optimal combination of comfort factors most suitable considering availability, efficiency, grid constraints, and conditions at adjacent subzones. Primary airflow is delivered to each terminal unit from the VAV box by a suitable pipe, duct or the like, indicated by 450. In some cases, a low-voltage (say 24 VDC) supply wire (not shown) may be provided from the VAV box to the terminal unit to power the terminal unit. A plenum rated cable should be used for that purpose in most applications.

Figure 5:
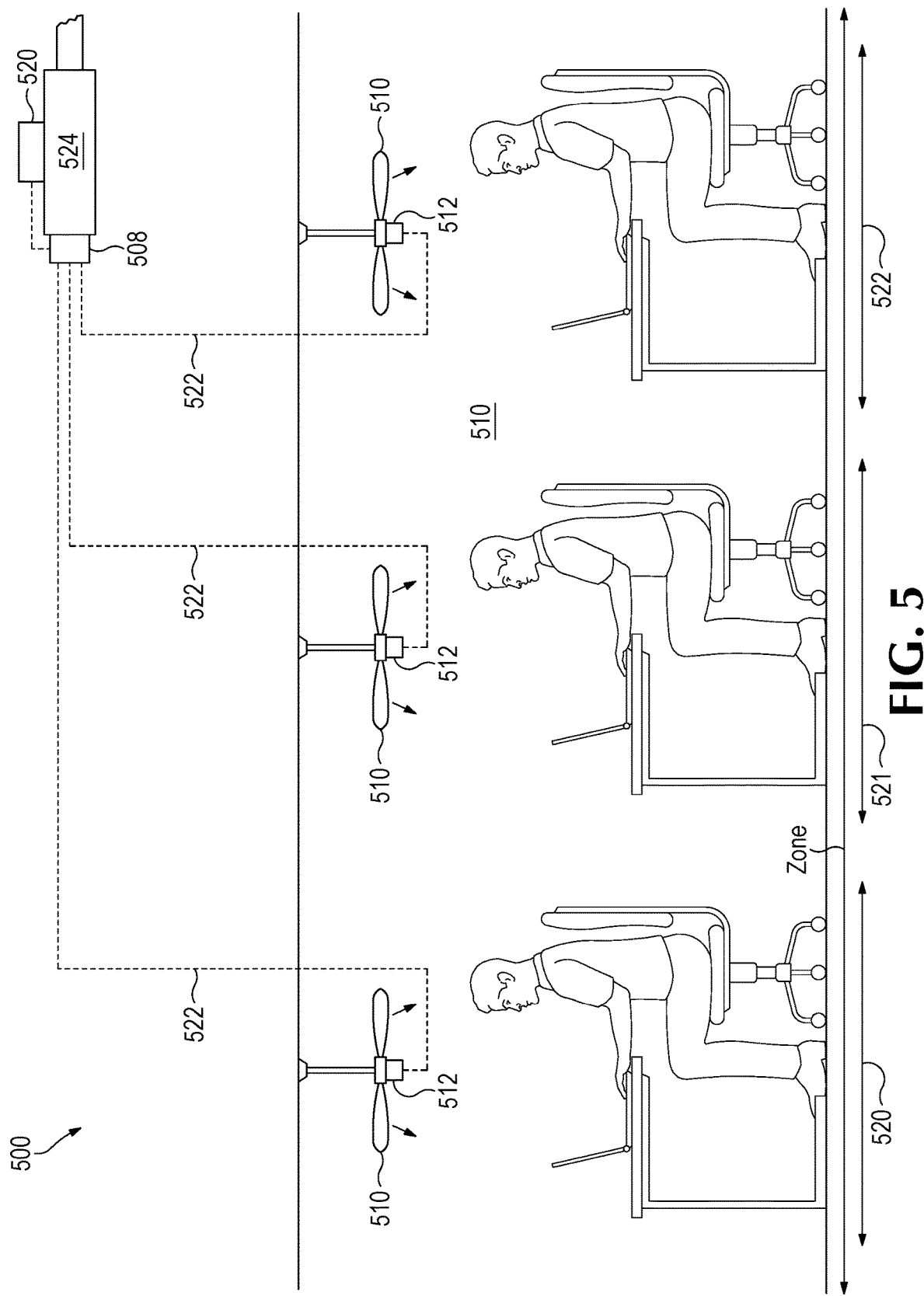
FIG. 5 is a simplified diagram that illustrates a generic comfort system which could be a VAV system, a radiant system or an underfloor or other system that integrates an auxiliary comfort component into the comfort system (in this case a ceiling fan) for each subzone.

To integrate with the new network, a Main subzone NRD 402 is coupled to each Uniterm, as shown in FIG. 4, or other local comfort device, as shown in FIG. 5 where the Main NRD is coupled to each local ceiling fan 510. The Main NRD contains circuitry for wired or wireless data communication with other components within the subzone and provides communication beyond the subzone which is described later. Specifically, in this embodiment, each Main NRD 402 communicates between the corresponding Uniterm 400, and with other auxiliary components that may be incorporated into the subzone system via Satellite NRDs, and a Zone Interface Device (ZID) 408 coupled to the BAS Zone Controller 420. And as shown later, each Main NRD 402 has the capacity to communicate directly with the building server. The Zone Interface Device also includes a processor, memory and Input/Output capacity to execute programmed logic, and a communications module. Preferably, data communicated from each Uniterm or other local unit in a zone is compiled in the Zone Interface Device 408 and an airflow setpoint adjustment for all subzones is established and communicated to BAS Zone Controller 420 at the VAV box using one of various techniques to meet the operational requirements of the particular Zone controller manufacturer and model.

In a preferred embodiment, at the zone level, the primary compilation of information is the summation of the airflow requirements from all the subzones and the status of the Uniterm damper positions to know if any are wide open or nearly wide open (this helps refine the air flow requirement transmitted to the BAS zone controller). Information required for control of the reheat element (if existing) of the VAV box is also compiled from subzones it serves that may desire heated air to more efficiently achieve the corresponding users' thermal comfort preferences.

In an embodiment, data, preferably including airflow requirements, and certain operational data is also compiled at each subzone Main NRD. Current operational efficiency data of the HVAC system (preferably including marginal cost data) and constraints from the grid serving energy to the building are communicated to the Main NRD in each subzone. Constraints may be imposed, for example, during a grid energy shortage, emergency, or high price period. Taking this data into account, the Uniterm or other primary comfort component in the subzone, through its Main NRD, can select and control an optimal combination and magnitude (output level) of auxiliary thermal comfort components and provide user information and other control services such as lighting control as desired by the workstation occupant. This information may be passed to the subzones from the zone level ZID. In another embodiment, certain of this information may be transmitted to the subzone Main NRD from the building server.

Once the information from the HVAC system is received and compiled as may be required into the correct form, the system and the subzone components are optimized in each subzone at each update interval using the Equal Marginal Performance Principle to achieve optimal operating energy requirements that meets the occupant's thermal comfort preferences in each subzone. In an embodiment the necessary calculations may be done in the Main NRD. In another embodiment certain of the necessary calculations may be done in the building server.

The subzone components are optimized with respect to the HVAC system. For example, if all occupants present in a zone desire cooler thermal sensation, then, within limits placed on acceptable local air movement, the marginal cost reduction for reducing the speed and energy requirements for the local subzone fans is compared with the marginal cost increase for adding more cooling from the HVAC system to each of the occupied workspaces to reduce the space temperature. If overall system marginal energy use and cost can be reduced by reducing the speed of the device fans and increasing the marginal cooling from the HVAC system to the zone, then the primary air volume at the affected subzones is increased and an increase in cooling command is sent to the zone. As added zone cooling occurs and the space temperature falls, localized air movement is reduced, reducing overall system energy use. Operation of the various devices is carried out in the optimized manner by the corresponding intelligent interfaces such as the VAV Box interface at the zone level, and the NRDs at the subzone level.

FIG. 5 is a simplified diagram that illustrates a system for control of a workspace such that the auxiliary comfort component operation is coordinated with the main comfort system for localized (subzone) thermal control at each workstation or space through coordinated control of more than a single comfort factor. This illustration shows a more generic HVAC system that could be a VAV system, but also could be a radiant comfort system or an underfloor or some other type of building comfort system that is not conducive to utilizing a Uniterm for the purposes of comfort control. In FIG. 5, each subzone utilizes a local ceiling fan 510 as the primary thermal comfort component, with a Main NRD 512 coupled to the fan for communications of data such as current fan speed. The Main NRD on each ceiling fan also provides an integrated temperature sensing device (not shown) and occupancy sensor, to communicate local temperature and occupancy in each subzone to the BAS zone controller 520, via wired or wireless communications indicated at 522.

In this scenario, sensors integrated into each auxiliary device 510 and the Main NRD 512 provide local temperature and occupancy conditions for thermal control by each unit. Whatever additional auxiliary components(s) that may be included are operated under control of the Main NRD logic to optimally control subzone comfort conditions by adjusting these comfort components(s) locally through the Main NRD. Data from each workstation or locality in the subzone is communicated (via the subzone Main NRD) to the ZID 508 which is interfaced to the BAS zone controller 520 at the VAV box, the radiant or underfloor system unit or other zone conditioning unit 524 to optimize its operation. Occupants can request adjustments in thermal and other conditions in a fashion identical to the preferred VAV system.

Figure 6:
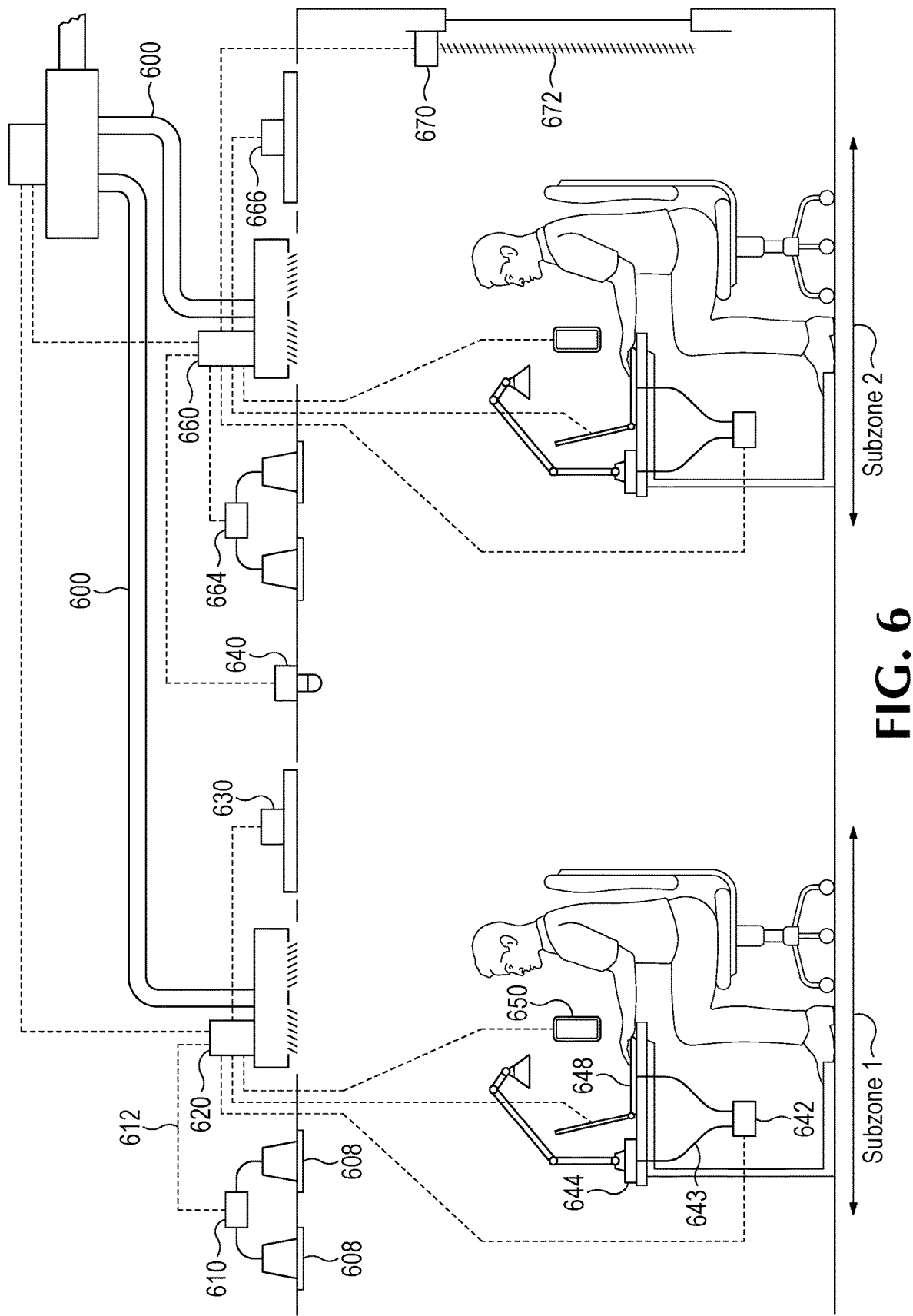
FIG. 6 provides a further illustration of network communications and operations for additional comfort and other localized devices that can be monitored and controlled by the system and the local controls.

FIG. 6 provides a further illustration of network communications and operations showing in particular optional auxiliary thermal comfort and other components that may be incorporated into the system at various subzones. This figure shows additional local auxiliary components, i.e., components in a subzone, interfaced to the smart diffuser controller through the one Main NRD 620 in each subzone. Each auxiliary component employs a Satellite NRD that communicates wirelessly with the Main NRD 620 in each subzone. A VAV box may supply conditioned air as before to subzone terminal units, via duct or other conduit, 600. Local subzone components may include, for example, ceiling lights 608 controlled by a satellite NRD lighting controller 610. The Satellite NRD lighting controller 610 is arranged for communications via (wired or wireless) path 612 with the smart diffuser Main NRD 620. Preferably, all communications in this drawing, shown by dotted lines, are wireless and bidirectional. Another example of a local comfort component is an auxiliary ceiling radiant heating panel and associated Satellite NRD controller 630. The Satellite NRD heating panel controller 630 also is arranged for communications with the local smart diffuser Main NRD 620 as are any other auxiliary components in the subzone. Similar equipment may be provided in additional subzones such as shown in Subzone 2.

Additional local components may include a workstation Satellite NRD appliance controller 642 which is also configured to communicate with the subzone smart diffuser Main NRD 620. The Satellite NRD's (not shown separately from the component) on, or coupled with, each auxiliary component in every subzone, communicates only with the Main NRD on the Uniterm (or primary subzone comfort component) in each zone which correlates and directs information to and from the auxiliary component as required. For example, if the user requests a change in the local thermal environment, the Main NRD will adjust the combination of local comfort components to achieve that change with the greatest marginal efficiency but subject to external or internal limitation.

If, for example, if the user in a subzone requests the auxiliary heating component to be shut off, that command will be received by the Main NRD 620 and then send an "off" command directly to the auxiliary heating Satellite NRD 630 and will then use other means that exist to maintain the desired local thermal conditions. The component will remain off with its "manual off" status highlighted on the user interface until the user releases that override command. Another Satellite NRD controller 642 individually controls the plug outlets on a power strip that provides power to user desktop equipment, for example, a desk lamp 644 (via power cord 643) or computer 648. The communication connections among components within each subzone may be wired or wireless, for example, via Bluetooth® wireless technology. An application program or "app" (not shown) may be provisioned on a computer 648 or on a smart phone, tablet or other mobile device 650 to provide a convenient user interface to interact with the Main NRD 642. The user interface communication is always to the Main NRD 620 which in turn provides communication to all other subzone components, overhead lighting, auxiliary heating, desktop light, and computer and/or any other subzone components integrated into the system.

Subzone 2 in FIG. 6 illustrates additional local components. These examples are not intended to be an exhaustive catalog. Of particular relevance are components that affect user thermal comfort. But other components that provide other amenities for subzone occupants such as air sanitizers, white noise generators, and many other component types may be incorporated into the system with an appropriate Satellite NRD coupled to it and monitored and controlled by the user through the system network. In the Subzone 2 portion of FIG. 6 is a another Uniterm and its Main NRD 660. The subzone network in Subzone 2 includes an auxiliary temperature/occupancy sensor and Satellite NRD 640, a Satellite NRD lighting controller 664, auxiliary Satellite NRD heating controller 666, and a general-purpose Satellite NRD 670 which may be coupled, for example, to control a window shade or covering 672. Also communicatively coupled to the controller 660 are the desktop/mobile user elements generally as described with regard to subzone 1. The mobile phone and or computer components in each subzone preferably provide the occupant (or "user") with communication to the cloud and the building server as well as to the local components and can be employed to set up and reconfigure the associated Uniterm and its associated components in the subzone. Thus, for a given subzone, the Main NRD and the associated NRDs together form a local communications sub-network. This sub-network is isolated from other subzone sub-networks using known network isolation and security technologies.

Figure 7:
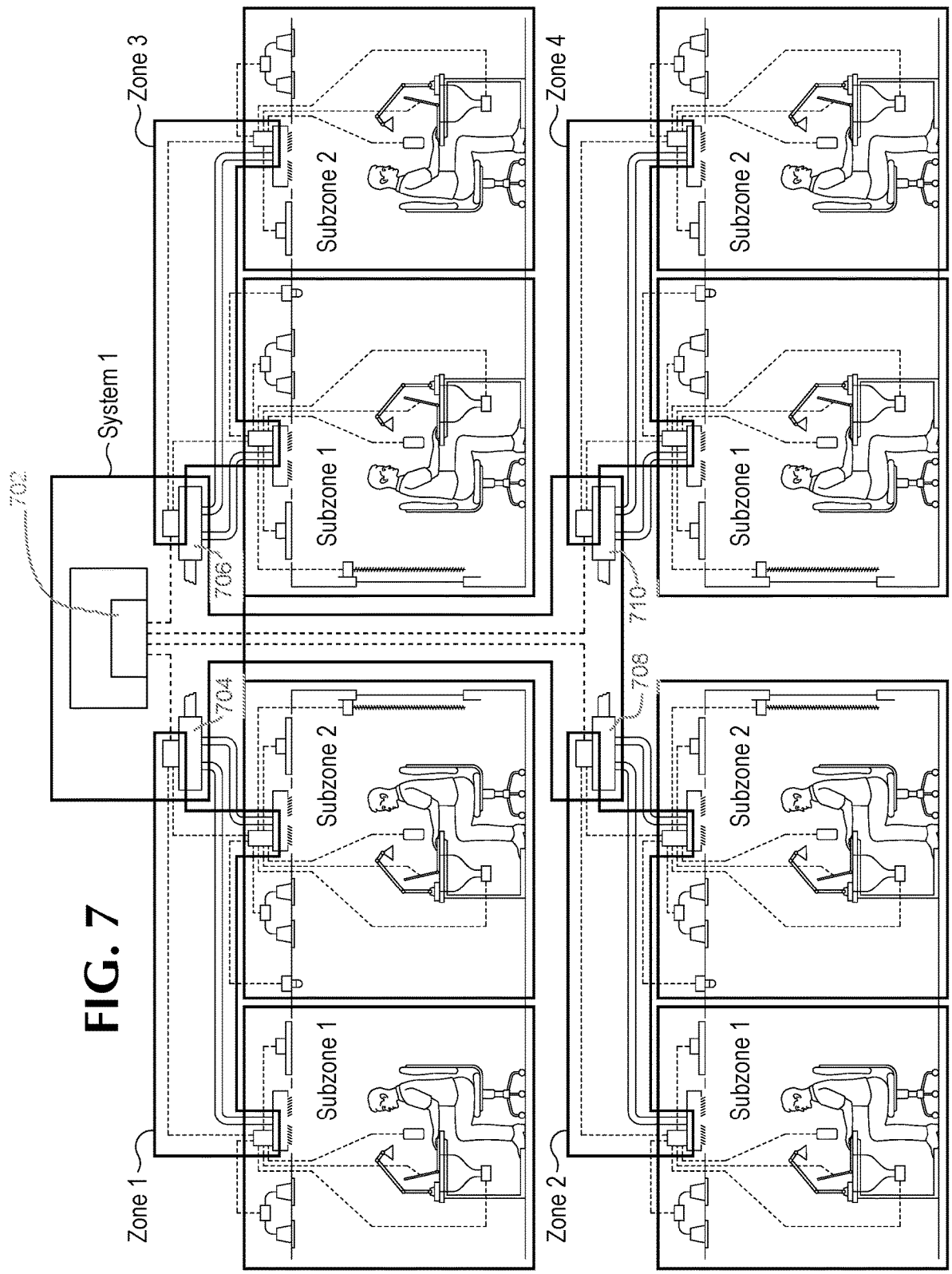
FIG. 7 illustrates communications for an example system comprising plural zones and respective subzones.

FIG. 7 provides a simple illustration of one example embodiment in which the system is configured in a series of thermal comfort zones in a building. Shown here is a schematic of the system operating on two floors with two zones on each floor and two subzones in each zone. This figure represents the system as applied to a VAV system, the most common type system for commercial buildings, but essentially the same network configuration would be applied to other thermal comfort system types. In this VAV system, the component at the top would be an air handler 702 that supplies conditioned air to each of the four VAV boxes (704, 706, 708 710) that provide the condition air to each zone. The dashed lines throughout show the hierarchy of communications. Some of these may be direct and others may pass through and incorporate other information from the building server which is not shown for simplicity. Each subzone incorporates a variety of components, some of which are comfort components that are integrated into a system to ensure each subzone can achieve the user's desired thermal comfort level. Subzone level components were described in detail with regard to previous drawing figures. Others, such as lights, computer, and window shades may be integrated into the subzone network so that the user has command over all these elements from a single wireless application. Such an application, in addition to providing thermal comfort adjustments and related interactions with the subzone Main NRD, may enable a user to control operation of selected components manually, or the NRD may control them based on schedule-based time, occupancy or other consideration. These connections may also permit the user to access a complete accounting of the workstation energy use and carbon footprint, which in some embodiments can be compared with groups of users to achieve a rating for the comparative workstation efficiency.

Figure 8:
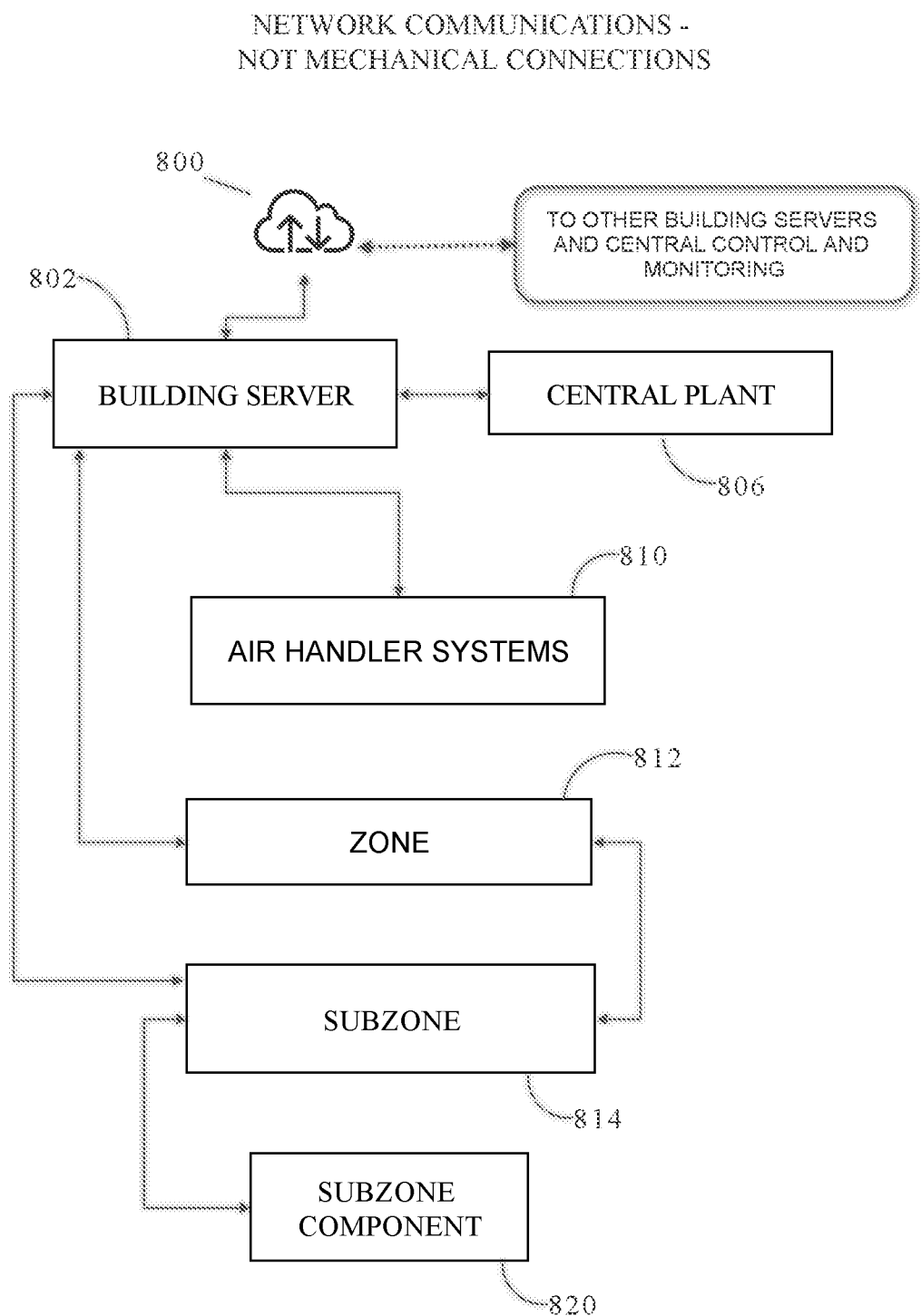
FIG. 8 is a simplified diagram illustrating communications for an example system comprising plural buildings.

FIG. 8 is a simplified block diagram illustrating an example comfort network electronic communication pathways (not mechanical connections). In FIG. 8, operating data is communicated from the NRDs (subzone level) and ZIDs (zone level) to the cloud 800 from the building server 802 where additional data is compiled, and interaction is returned regarding occupant preferences, overall optimization, current energy grid operating parameters, etc. to provide specific parameters to each element in the building comfort system and other systems on the network as well as to the occupants in order to engage them making thermal comfort and energy choices informed by specific constraints on the overall system that might occur.

In one example implementation, a system may be designed as follows. It comprises a) Building Central Equipment 806—b) Air Handler Systems 810—c) Zone 812—d) Subzone (Main NRD with user interface) 814—e) subzone component 820. Intra-building networks are to be wireless where possible. Occupant wireless connection is limited to the local subzone Main NRD & certain global information. Selected configuration and setup features can be defined/altered at local level with automatic network updates. For example, the subzone may have an air cleaning or sanitizing component which the user can set for timed or continuous operation through the user interface. Or the user can add or eliminate a subzone component through the user interface, or set limits on allowable air movement in the subzone, etc. In some embodiments, selected data or elements can be accessed across network divisions. So, for example, all users may be able to read the outside air weather conditions, schedules for HVAC system operation and other information relevant to all building occupants. This data may be provided by the Building Server.

In one example implementation, network capacity requirements may be, for example:

Network(s) consists over time of unlimited numbers of Interconnected Buildings

Each Building has 1 to 50 or more Systems

Each System has 1 to 30 or more Zones

Each Zone has 1 to 12 or more Subzones

Each Subzone has 1 to 6 or more Components+Cell phone connection

Figure 9:
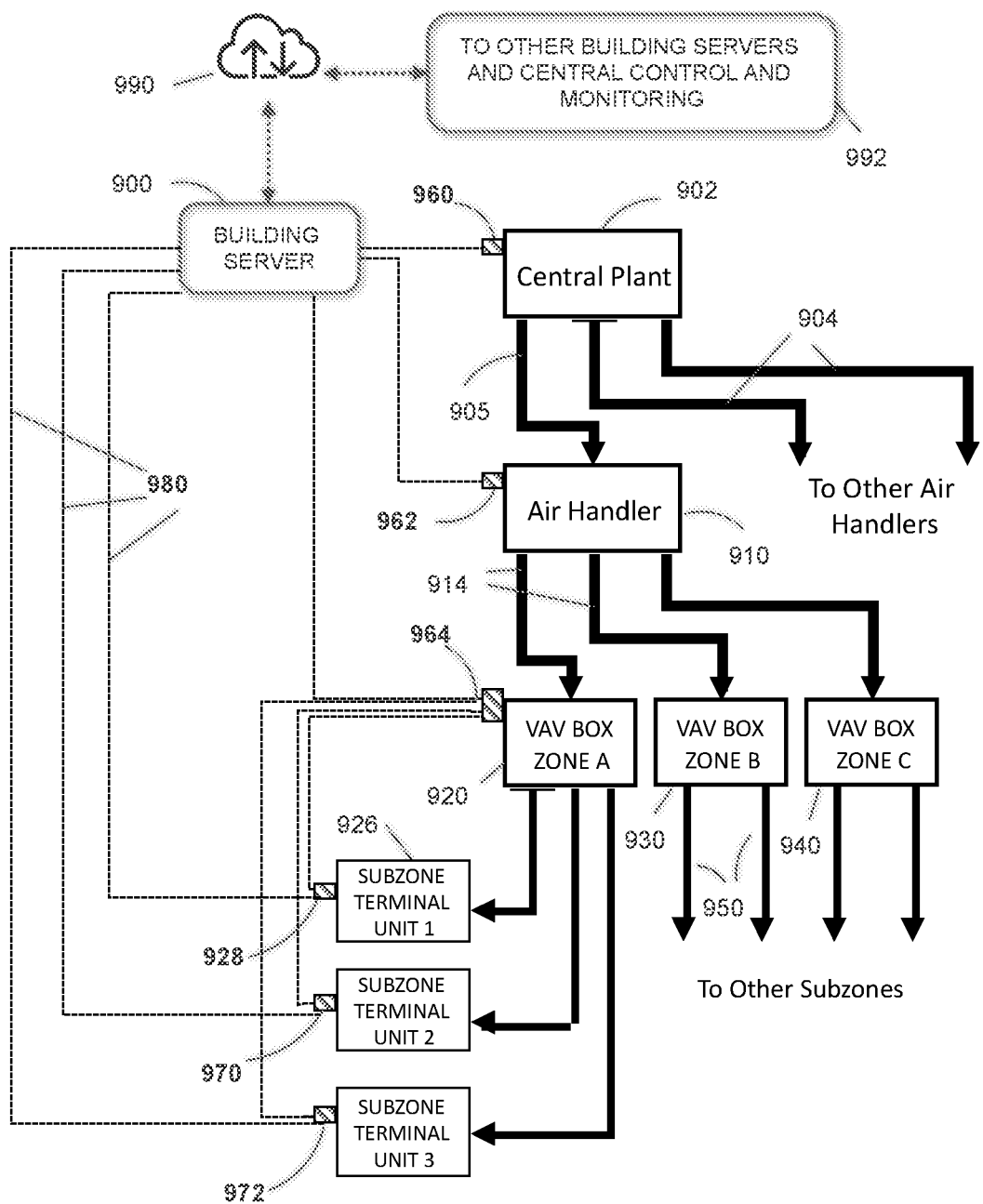
FIG. 9 is a simplified schematic diagram illustrating the mechanical components and the communication connections of the methods and system in accordance with one embodiment of the present disclosure.

Each Subzone Component has 1 to 12 or more discrete points of control or information FIG. 9 is a simplified system diagram in accordance with one embodiment of the present disclosure. This conceptual diagram illustrates plural building control systems interfaced via the internet cloud 990 to other building servers and a central server, box 992. This central server is not the same as an individual building server (900); rather, the central server can provide centralized HVAC control and monitoring over multiple buildings from any location. So, for example, if an authorized entity develops an improved algorithm for HVAC operational efficiency, it can download the improved software from the cloud to each of the building servers (900) under its control.

A building server 900, suitably programmed, is provisioned. It may be on site at a building or remote. The building server 900 is configured for data communications, preferably wireless communication, with various components as follows. The building server is communicatively coupled to the building central plant 902, via interface 960, as indicated by a dashed line. The building server 900 also is communicatively coupled to each air handler, for example, air handler 910 (via interface 962) which is served Heating or cooling resources from the central plant 902 using air or liquid fluids via piping, conduit or duct 905. Similarly, the central plant 902 may serve other air handlers via suitable pipes, conduits or ducts 904. Each additional air handler (not shown) preferably has means for communication with the building server 900.

The air handler 910 serves plural zones in the building, some of which may have a zone VAV box, such as VAV Box Zone A indicated at 920. Each zone VAV box is served via a conduit or duct 914 to bring conditioned airflow to the zone VAV box from the air handler. Similarly, a VAV Box Zone B 930 may be served by the air handler 910 via duct 914. In turn, the VAV box 930 serves its subzones via ducts 950. Another VAV Box Zone C indicated at 940 is similarly arranged to serve its subzones.

VAV Box Zone A, 920 has an associated ZID (zone interface device) 964 for communication with building server 900 and to execute data compilation, control and reporting operations as described herein. The VAV box 920 is arranged to serve and control terminal units in each of its subzones. One example is subzone terminal unit 1 shown at 926 which has associated Main subzone NRD 928 for control operations and communications with the zone box A via ZID 964. Additional subzone terminal units 2 and 3 are also served by VAV box 920 along with communications via additional Main NRDs 970, 972. In addition, each of the Subzone Terminal Unit Main NRDs 928 970, 972 have the option of communicating directly with the Building Server 900, for example, through a high-speed wireless connections 980. While the comfort system(s) in any building may be configured somewhat differently than as shown in FIG. 9, the hierarchy of a system that converts incoming energy into heating or cooling, to a system that distributes this energy to one or more zones is common among virtually all commercial building comfort systems. The communication paths (dashed lines) shown in FIG. 9 can be applied to nearly all commercial building comfort conditioning systems.

An alternative strategy for system optimization is also provided by the present disclosure. In an air supply system, added cooling to the zone to lower the space temperature can be provided by either increasing airflow to the zone or reducing the temperature of the airflow to the zone. In an embodiment of the present disclosure, the marginal costs of these changes and the marginal costs of the local control devices with respect to cooling effect are all considered. The programmed logic preferably applies the known Equal Marginal Performance Principle, to establish and maintain the optimal relationship for all these units, while preserving the thermal comfort desires of the occupants who are present.

Because commercial buildings are always (or nearly always) operating at less than full occupancy, the optimization of this system of network-connected occupancy detecting individual comfort control devices, combined with optimization with the HVAC system, results in much improved occupant comfort and a substantial reduction in overall building energy use, as confirmed by model simulations.

Figure 10:
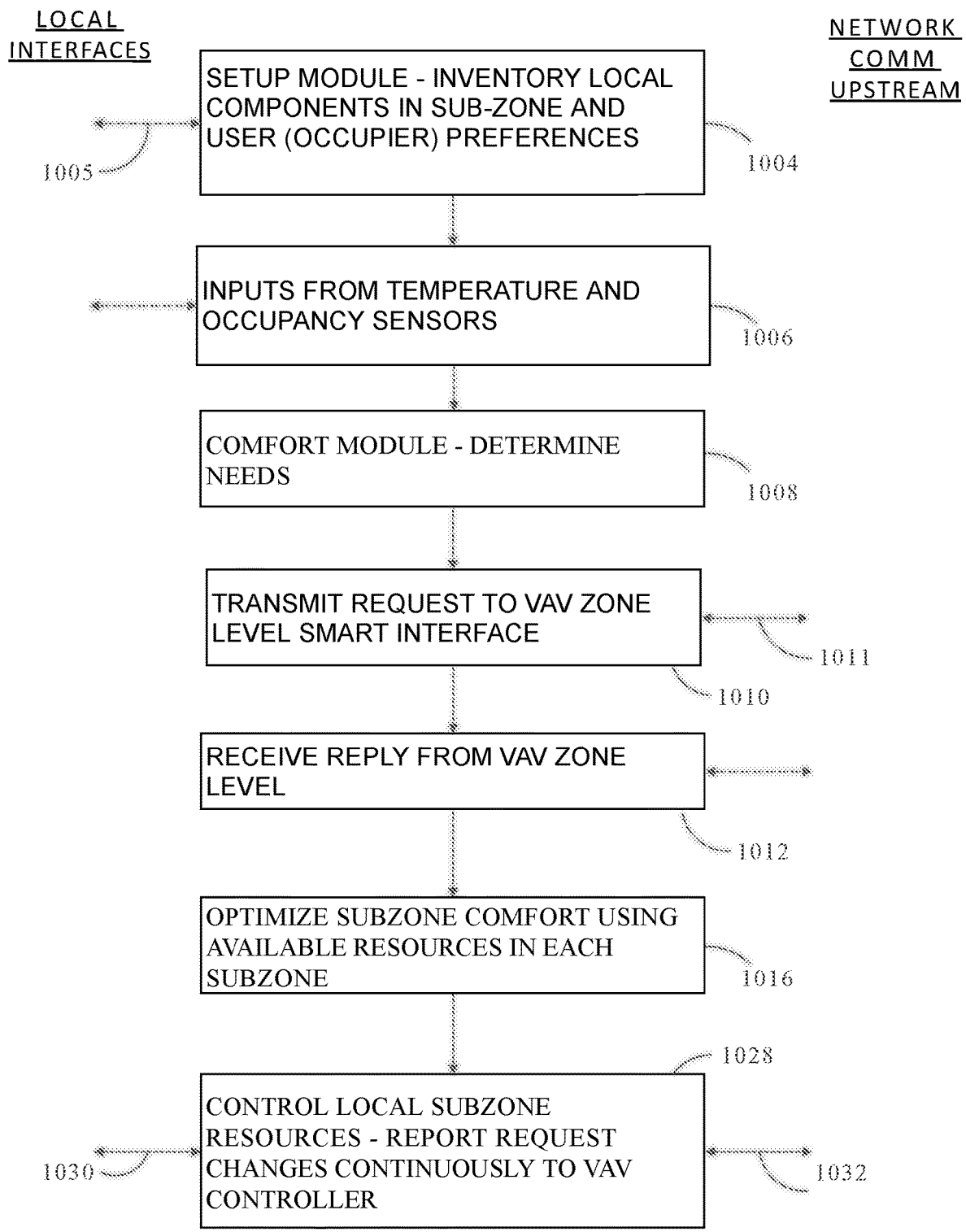
FIG. 10 is a simplified block diagram illustrating example communications and operations of a controller coupled to a multi-functional smart unit (Uniterm).

FIG. 10 is a simplified block diagram illustrating example communications and selected operations of a smart diffuser or terminal unit controller (Uniterm). The controller may be integrated in the terminal unit. In another embodiment, the controller may be integrated into an NRD coupled to the terminal unit. The controller includes a processor and software to carry out the following functions. At block 1004, the controller may execute a setup module to inventory local components in the sub-zone and user (occupier) preferences. This may be done using the local interfaces 1005. See the description above with regard to FIG. 4.

At block 1006, the controller acquires input data inputs from temperature and occupancy sensors in the zone. Again, local interfaces may be used, wired or wireless. At block 1008, a comfort module determines what changes are needed in the subzone to accommodate the subzone (user) thermal comfort preferences. These may be default values or updated by the user. To that end, in an embodiment, the controller may transmit a request for information to the VAV (zone) level smart interface. This may be done using network communications 1011, discussed above.

At block 1012, the controller receives the requested information from the zone level controller, including, for example, current cost data for incremental changes in supplied air volume and temperature. Certain of this information may also come from the building server depending in part on the configuration of the building HVAC system and the BAS network. At block 1016, the controller executes code to optimize settings for the subzone, in terms of lowest cost and highest user satisfaction (based on user thermal comfort preferences). It determines the best combination for applying the available resources, including the subzone components and the VAV box. The Main subzone component controller then operates that component and if auxiliary components exist in the subzone, sends commands to control the local components via their Satellite NRDs accordingly, via communications 1030 from the Main NRD. Likewise, it sends commands to the VAV controller to request an adjustment to airflow volume or re-heat if applicable, via communications 1032 also from the Main NRD.

Figure 11:
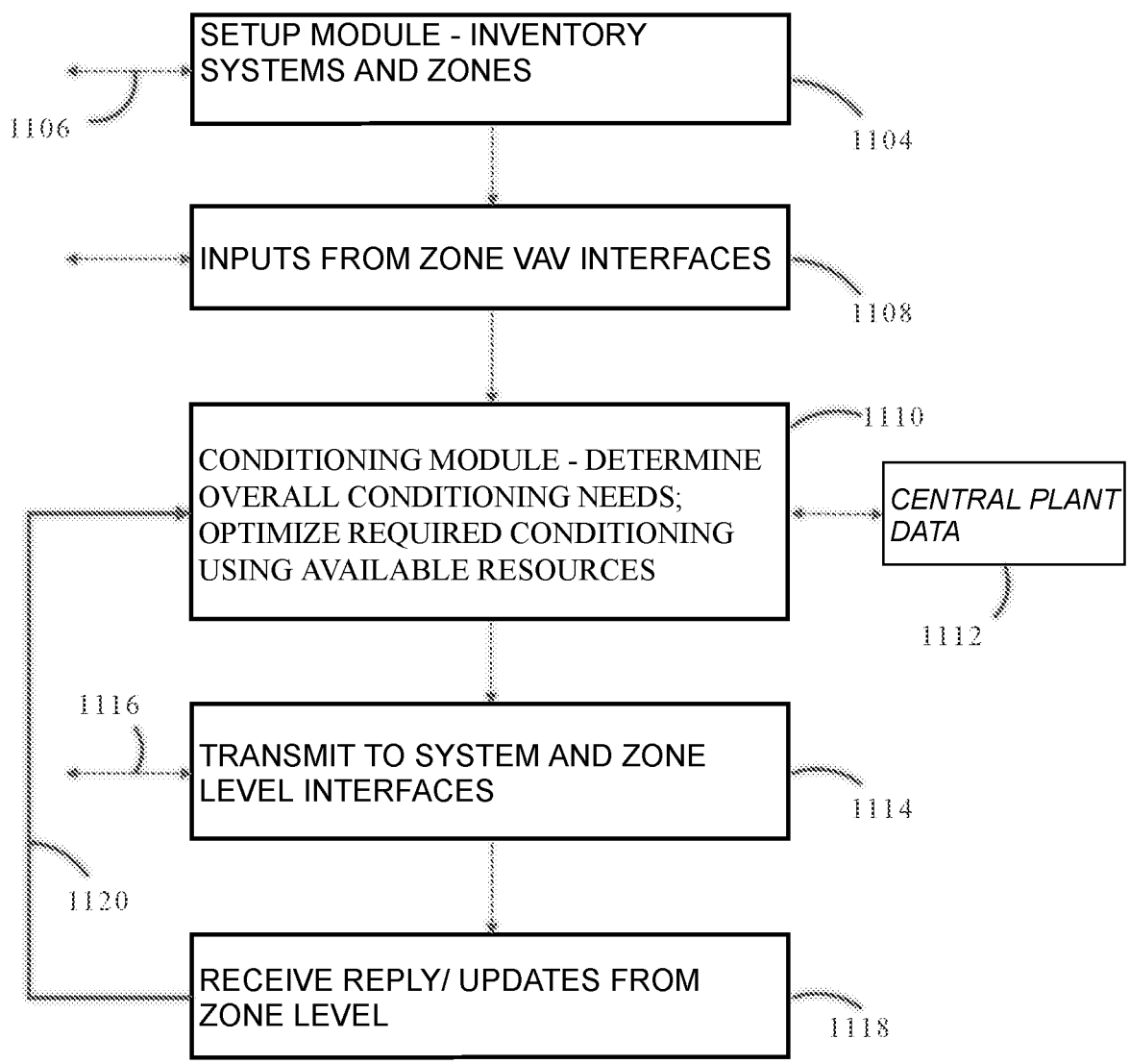
FIG. 11 is a simplified block diagram illustrating some of the communications and operations of an Air Handler level controller.

FIG. 11 is a simplified block diagram illustrating some of the communications and operations of an Air Handler level controller. At block 1104 the controller executes a setup module to inventory the systems and zones it serves. It does so using a communications link 1106 which generally communicates with the building server. It further receives inputs from zone VAV controllers, block 1108. The controller executes a conditioning module to determine overall airflow needs and optimize conditioning to zones using available resources, generally a combination of airflow and air temperature, block 1110. This determination includes receiving data from the associated heating and cooling resource provider, for example, a central HVAC plant 1112. At block 1114 the air handler controller transmits operating instructions to the zone level interfaces, to implement the optimized settings. These may be transmitted over a communications link or network 1116. Next the controller receives replies and or updates from the zone level, block 1118. Then the process loops via 1120 to provide updates to the conditioning module, block 1110. That module may then update or re-calculate the overall conditioning needs and optimization settings.

Figure 12:
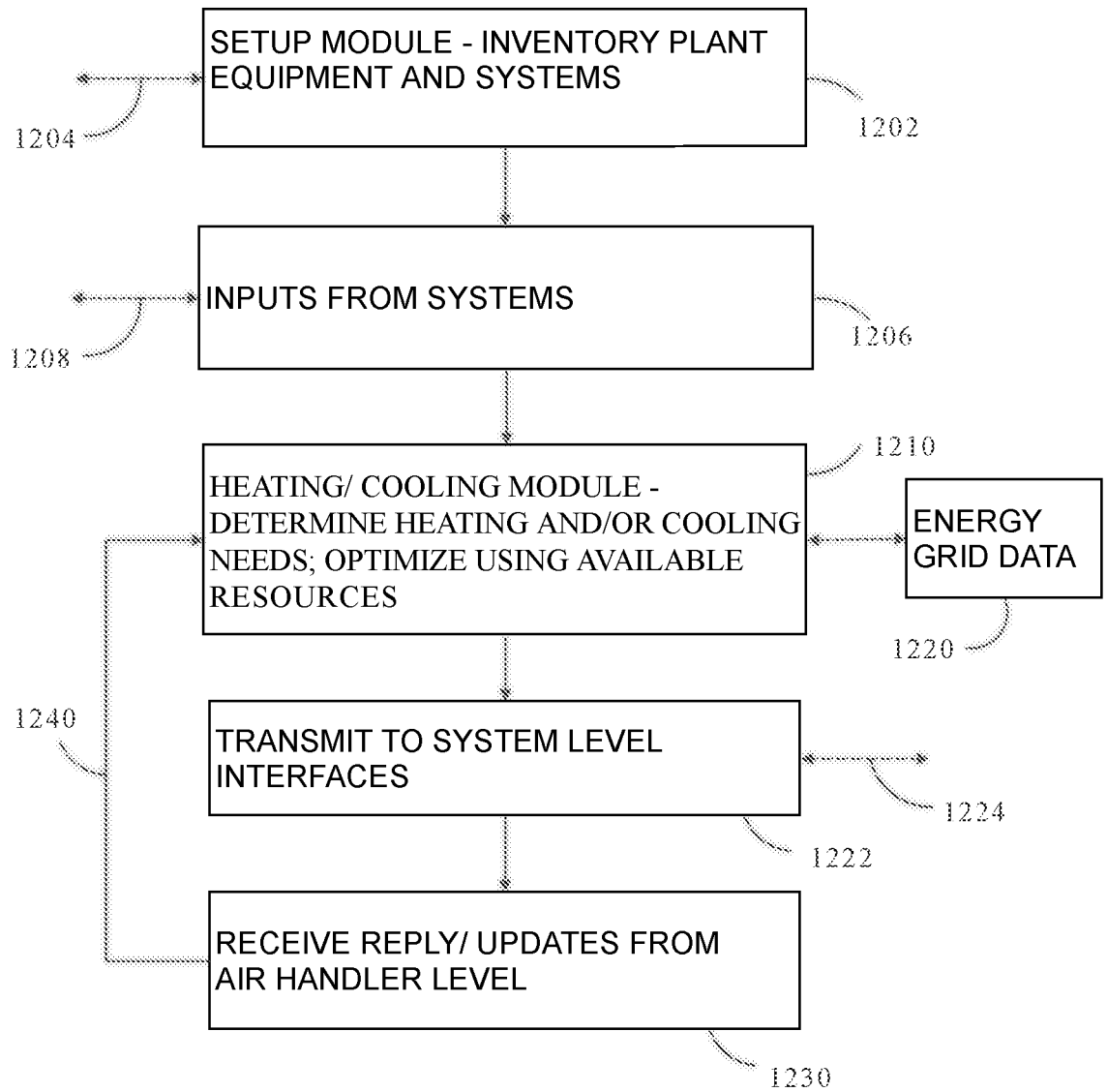
FIG. 12 is a simplified block diagram illustrating some of the communications and operations of a Central Plant level controller.

FIG. 12 is a simplified flow diagram illustrating some of the communications and operations of a building central plant level controller. At block 1202, the controller executes a setup module to inventory the central plant systems and the air handlers it serves using communication link 1204 in communication with the building server. It also receives information from the systems it serves 1206, generally air handlers, via communications 1208. The controller executes a heating and cooling software module to determine heating and cooling requirements needed by the systems (air handlers) using available resources, generally a combination of fluid (liquid or air) and fluid temperature, block 1210. This determination includes receiving energy grid data 1220 regarding constraints, including short term cost adjustments, from the associated energy grid(s) that provide(s) energy to the building which may be a combination of fuels, some of which may be generated onsite.

At block 1222 the central plant controller transmits operating instructions to the air handler (system) level interfaces, via 1224, to implement the conditioning with optimized settings that accommodate any necessary constraints. Next, the central plant controller receives replies and or updates from the air handler (system) level, block 1230. Then the process loops via 1240 to provide updates to the heating and cooling module, block 1210. That module may then update or re-calculate the overall heating and cooling needs and optimization settings, and repeat the foregoing process.

In another example embodiment, a system may include the following elements:

a VAV box unit arranged to provide conditioned airflow into a zone in a commercial building;

a VAV box controller operatively coupled to the VAV box unit to control airflow volume through the VAV box unit into the zone;

a zone interface device (ZID) coupled to the VAV box controller for interfacing a subzone network to the VAV box controller;

a primary thermal control component installed to serve a subzone in the zone;

a Main NRD (network ready device) operatively coupled to the primary thermal control component;

the subzone having first and second means of adjusting the subzone thermal level installed in the subzone, the first means comprising a first element of the primary thermal component and the second means comprising either a second element of the primary thermal component or a separate auxiliary comfort component; and a Satellite NRD operatively coupled to the auxiliary comfort component;

wherein the Main NRD includes hardware and/or software logic configured to— store a thermal comfort preference value of a user of the subzone;

receive local temperature and occupancy conditions from sensors in the subzone;

if the space is occupied, compare the local temperature condition to the stored thermal comfort preference; and adjust thermal comfort conditions of the subzone, based at least in part on the comparison, so as to achieve the stored thermal comfort preference value in the subzone;

wherein adjusting the thermal comfort conditions of the subzone includes at least one of— communicating a request to the ZID to adjust the VAV box airflow volume into the zone;

communicating a control request to the primary thermal control component; and communicating a request to the auxiliary thermal comfort means via Satellite NRD to control the auxiliary comfort component when present.

One of the novel aspects of the present disclosure is incorporating into multiple individual thermal adjustment components the sensing of occupancy, thermal conditions, and thermal condition desires at each workspace (subzone), and the networking of this information both throughout the zone and with the HVAC system to optimize both occupant comfort and system energy use.

The present systems and methods are not reliant on any specific individual thermal adjustment component (or multiple components) that may be used by each occupant. Nor is it necessary that all components on the network be the same or employ the same or similar means for thermal adjustment. Through employing the Equal Marginal Performance Principle for optimization, the characteristics of each component (the marginal cost for marginal thermal sensation change) is embedded into the controller for each component and these are combined to optimize the zone and the overall HVAC system just as described in the Preferred embodiment. Similarly, the type of HVAC system to which this invention is applied is entirely flexible. In the US, variable air volume (VAV) systems are the most common in commercial buildings, but radiant (either ceiling or floor based) and underfloor air systems are also employed from time to time in commercial buildings and again, employing the types of personal control components that are appropriate for each system type, the identical configuration of this separate network, and control logic, appropriately customized, can be applied to optimize both occupant comfort and overall system energy performance.

Implementation Hardware and Software

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A method for improving user comfort and optimizing building energy efficiency in a commercial building served by an HVAC system, comprising:
   identifying a zone of a building that is served by a zone-wide primary comfort component, the zone-wide primary comfort component operated by a zone controller;
   designating plural subzones within the zone, each subzone arranged to receive thermal comfort conditioning from the primary comfort component;
   in each designated subzone, providing a local subzone controller associated with the corresponding subzone, thereby defining a one-to-one relationship between each local subzone controller and the corresponding subzone;
   in each local subzone controller, identifying at least one auxiliary thermal comfort control component that is local to the subzone and operated by the subzone controller;
   in each local subzone controller, determining current occupancy status, current thermal comfort conditions and current comfort settings of the subzone;
   in each local subzone controller, calculating a comfort factor adjustment to satisfy the current subzone comfort settings based on the current occupancy status and the current thermal comfort conditions;
   determining a least-cost or most energy efficient combination of adjustments (a) to the zone-wide primary comfort component and (b) to operation of the subzone auxiliary thermal comfort component(s) to achieve the calculated comfort factor adjustment;
   communicating the determined primary comfort component adjustment as a request to the zone controller;
   determining and executing an immediate adjustment to operation of the identified subzone auxiliary thermal comfort component(s) to achieve the calculated comfort factor adjustment with the current state of the zone wide thermal comfort component so as to accelerate achieving the desired subzone thermal comfort setting; and
   periodically readjusting the operation of the subzone auxiliary comfort component(s) as the zone-wide comfort component is adjusted by the zone controller, thereby to increase overall efficiency of the conditioning system and meet the current desired thermal comfort setting at all subzones.

2. The method of claim 1 including:
   in the zone controller, aggregating all subzone adjustment requests and determining an adjustment of the primary zone-wide comfort component that best satisfies all subzone adjustment requests; and
   applying the determined adjustment to operation of the primary zone-wide comfort component.

3. The method of claim 1 including:
   receiving an action request input from a local user interface associated subzone, the requested action to modify a thermal comfort value of the subzone away from a predetermined default thermal comfort value;
   estimating energy cost or environmental consequences of the requested action;
   communicating via the local user interface to inform of the energy or environmental consequences of the requested action;
   receiving a reply from the local user interface to modify the requested action or continue with the requested action;
   responsive to the reply indicating continue with the requested action, executing the requested action; and
   responsive to the reply indicating a modification of the requested action, modifying the requested action to form a modified request and executing the modified request.

4. The method of claim 1 including:
   receiving data in the subzone controller regarding external energy cost or availability constraints;
   calculating zone and subzone thermal comfort adjustment necessary to accommodate the constraint;
   communicating the proposed adjustment in a message to the local user interface of the sub zone;
   receiving a reply from the local user interface to modify the proposed action or continue with the proposed action;
   responsive to the reply indicating continue with the proposed action, executing the proposed action; and responsive to the reply indicating a modification of the proposed action, modifying the proposed action to form a modified action and executing the modified action.

5. The method of claim 1 including:

communicating in a message to the local user interface a cost and or environmental impact of a requested user subzone thermal comfort adjustment;

receiving a user response to uphold, modify, or abandon the initially requested adjustment; and responsive to the users response, executing the selected option to uphold, modify or abandon the requested subzone thermal comfort adjustment.

6. The method of claim 1 including:

receiving control signal inputs based predetermined thermal comfort preference data as well as constraints resulting from differing thermal comfort preferences at adjacent subzones and/or external energy cost or availability constraints; and adjusting operation of at least some of the subzone comfort control components responsive to the control signal inputs, wherein the adjusting step balances the costs and effectiveness of local (zone and subzone) comfort control component adjustments versus the costs or availability of the HVAC system supply adjustments to arrive at an optimal combination of comfort factor adjustments in terms of both energy efficiency and system constraints or limitations to achieve each subzone's corresponding default comfort values.

7. The method of claim 1 including:

receiving lighting control inputs via user interfaces of the subzones; and adjusting the lighting conditions in each subzone based on the control signal inputs and the stored occupant preferences as well as constraints resulting from differing preferences at adjacent workstations and/or external energy cost or availability constraints.

8. The method of claim 1 wherein the adjustment is first subject to approval from an occupant(s) either directly or by setup limits established by the occupant(s) of the subzone before being implemented and if not approved is subject to an alternate adjustment that achieves a desired comfort level in a manner that is approved by the occupant(s).

9. The method of claim 1 wherein a user interface is implemented by an application program executable on a smartphone device.

10. The method of claim 1, wherein the subzone controller is incorporated into a user interface associated with the subzone.

* * * * *